US012674979B2

(12) United States Patent
Blumhardt et al.

(10) Patent No.: US 12,674,979 B2
(45) Date of Patent: Jul. 7, 2026

(54) ROBUST USER PRESENCE DETECTION

(71) Applicant: Apple Inc., Cupertino, CA (US)

(72) Inventors: William E Blumhardt, San Francisco, CA (US); Tyler R Calderone, Boulder, CO (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/037,430

(22) Filed: Jan. 27, 2025

(65) Prior Publication Data

US 2025/0251592 A1    Aug. 7, 2025

Related U.S. Application Data

(60) Provisional application No. 63/549,093, filed on Feb. 2, 2024.

(51) Int. Cl.
| | |
|---|---|
| *G02B 27/00* | (2006.01) |
| *G02B 27/01* | (2006.01) |
| *H04N 13/344* | (2018.01) |
| *H04N 13/383* | (2018.01) |
| *H04N 13/398* | (2018.01) |
| *G06V 20/50* | (2022.01) |

(52) U.S. Cl.
CPC ..... *G02B 27/0093* (2013.01); *G02B 27/0172* (2013.01); *H04N 13/344* (2018.05); *H04N 13/383* (2018.05); *H04N 13/398* (2018.05); *G02B 2027/0138* (2013.01); *G02B 2027/0178* (2013.01); *G06V 20/50* (2022.01)

(58) Field of Classification Search
CPC ............ G02B 27/0093; G02B 27/0172; G02B 2027/0138; G02B 2027/0178; H04N 13/344; H04N 13/383; H04N 13/398; G06V 20/50
See application file for complete search history.

(56) References Cited

U.S. PATENT DOCUMENTS

| | | | |
|---|---|---|---|
| 9,848,127 | B2 | 12/2017 | Dopilka et al. |
| 10,203,762 | B2 | 2/2019 | Bradski et al. |
| 11,275,482 | B2 | 3/2022 | Osterhout et al. |
| 11,402,902 | B2 | 8/2022 | Parshionikar |

(Continued)

FOREIGN PATENT DOCUMENTS

| | | |
|---|---|---|
| CN | 103731659 A | 4/2014 |
| CN | 109061662 A | 12/2018 |

(Continued)

*Primary Examiner* — Dmitriy Bolotin
(74) *Attorney, Agent, or Firm* — Thompson Hine LLP

(57) ABSTRACT

Various implementations disclosed herein include devices, systems, and methods that monitors for user presence to determine if a head mounted device (HMD) display should be active or inactive. For example, a process may obtain first sensor data from a first sensor on the HMD. The sensor may be configured to capture sensor data corresponding to an eye box region in front of at least one display of the HMD. Based on the sensor data, the process may detect a gaze of a user of the HMD and based on detecting the gaze, an initial user presence corresponding to a user wearing the HMD is determined. Based on determining the initial user presence, the process may activate the at least one display of the HMD by changing a state of the at least one display from an inactive state to an active state.

20 Claims, 8 Drawing Sheets

(56)　　　　　References Cited

U.S. PATENT DOCUMENTS

| | | | |
|---|---|---|---|
| 11,520,152 B1 * | 12/2022 | Lau | ..................... G02B 27/0172 |
| 11,716,412 B2 | 8/2023 | Hoellwarth | |
| 2011/0115703 A1 | 5/2011 | Iba et al. | |
| 2015/0029088 A1 * | 1/2015 | Kim | ..................... G02B 27/017 |
| | | | 345/156 |
| 2015/0130711 A1 * | 5/2015 | Lee | ..................... G02B 27/017 |
| | | | 345/156 |
| 2019/0101980 A1 * | 4/2019 | Stafford | ................. G02C 11/10 |
| 2019/0235255 A1 * | 8/2019 | Seibert | ..................... G06F 3/011 |
| 2023/0094048 A1 * | 3/2023 | Neves Creto | ............ G08B 5/22 |
| | | | 345/156 |
| 2025/0251592 A1 * | 8/2025 | Blumhardt | ........... H04N 13/383 |

FOREIGN PATENT DOCUMENTS

| | | |
|---|---|---|
| JP | 6315118 B | 11/1994 |
| KR | 20160078083 A | 7/2016 |

* cited by examiner

600

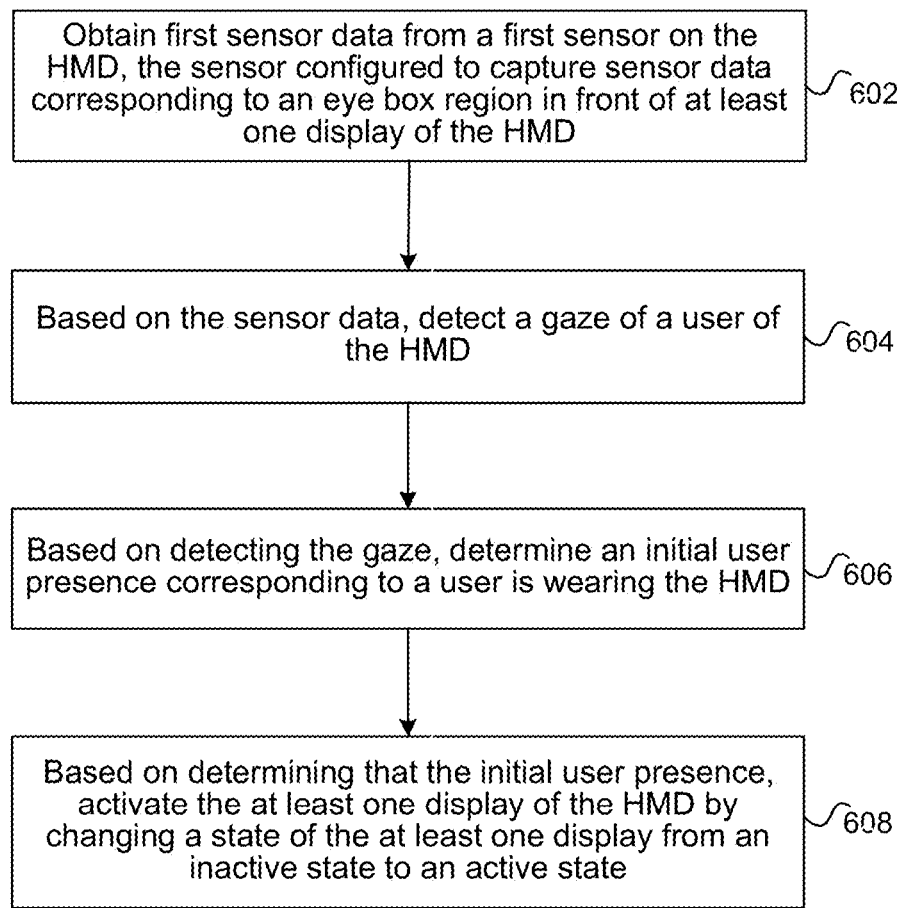

Obtain first sensor data from a first sensor on the HMD, the sensor configured to capture sensor data corresponding to an eye box region in front of at least one display of the HMD ⟿602

Based on the sensor data, detect a gaze of a user of the HMD ⟿604

Based on detecting the gaze, determine an initial user presence corresponding to a user is wearing the HMD ⟿606

Based on determining that the initial user presence, activate the at least one display of the HMD by changing a state of the at least one display from an inactive state to an active state ⟿608

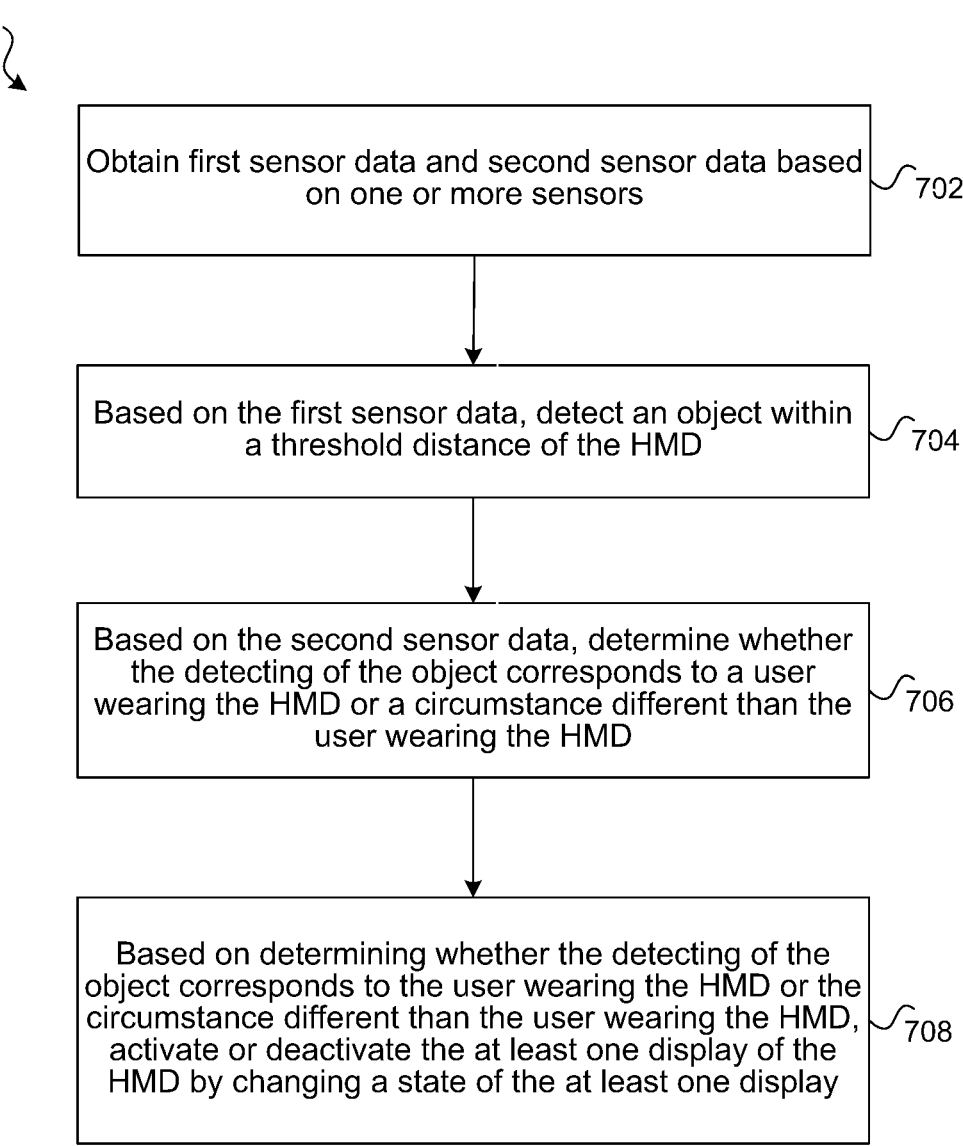

Obtain first sensor data and second sensor data based on one or more sensors      702

Based on the first sensor data, detect an object within a threshold distance of the HMD      704

Based on the second sensor data, determine whether the detecting of the object corresponds to a user wearing the HMD or a circumstance different than the user wearing the HMD      706

Based on determining whether the detecting of the object corresponds to the user wearing the HMD or the circumstance different than the user wearing the HMD, activate or deactivate the at least one display of the HMD by changing a state of the at least one display      708

FIG. 7

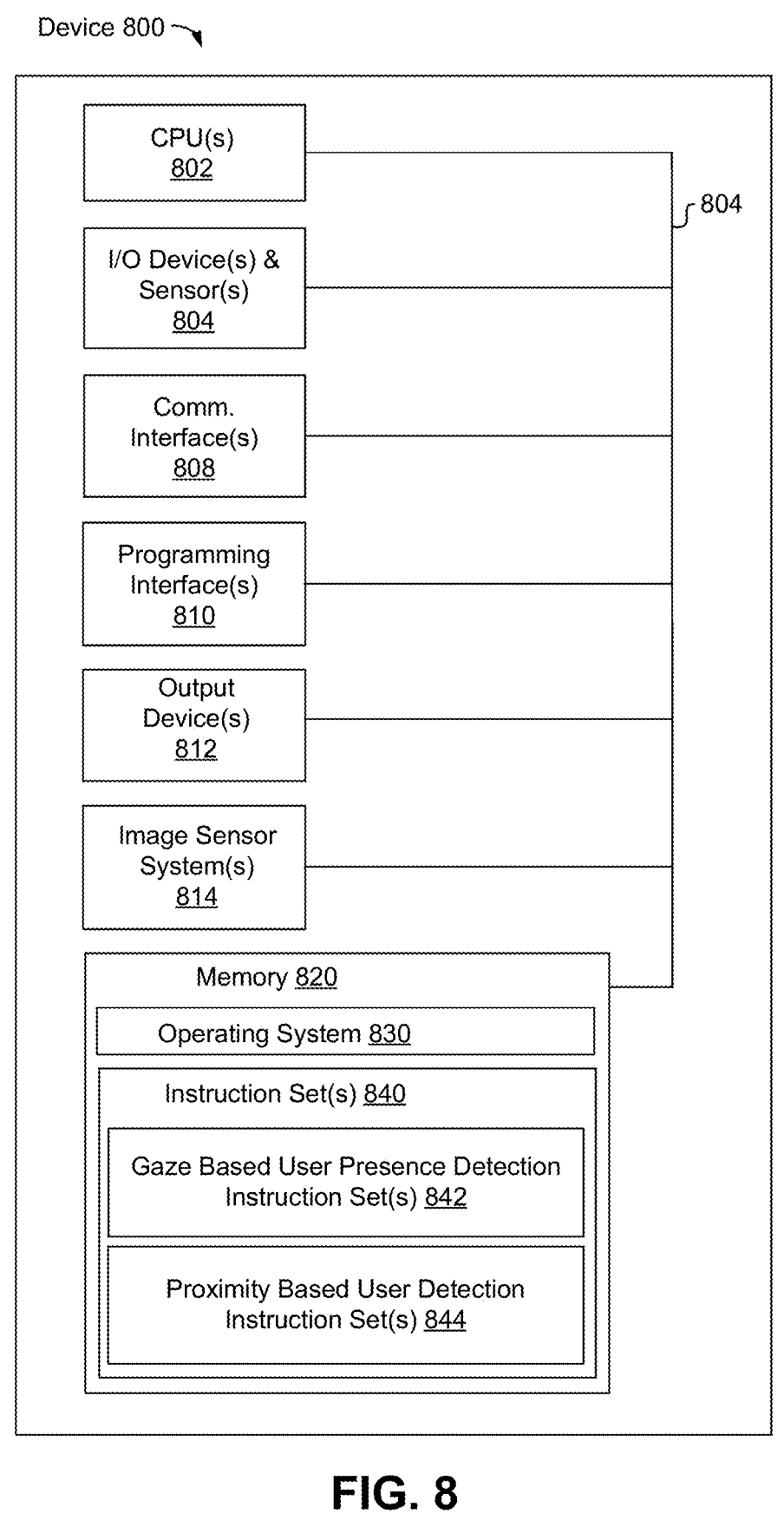

Device 800

CPU(s)
802

I/O Device(s) &
Sensor(s)
804

Comm.
Interface(s)
808

Programming
Interface(s)
810

Output
Device(s)
812

Image Sensor
System(s)
814

804

Memory 820

Operating System 830

Instruction Set(s) 840

Gaze Based User Presence Detection
Instruction Set(s) 842

Proximity Based User Detection
Instruction Set(s) 844

FIG. 8

ROBUST USER PRESENCE DETECTION

CROSS-REFERENCE TO RELATED APPLICATIONS

This application claims the benefit of U.S. Provisional Application Ser. No. 63/549,093 filed Feb. 2, 2024, which is incorporated herein in its entirety.

TECHNICAL FIELD

The present disclosure generally relates to systems, methods, and devices that provide user presence detection to control a corresponding state of a display of a wearable device.

BACKGROUND

Existing device activation techniques may be improved with respect to accurately detecting a user operating a device to enable viewing of a display of the device.

SUMMARY

Various implementations disclosed herein include devices, systems, and methods that are configured to monitor for user presence with respect to a user currently wearing a device such as a head mounted device (HMD). In some implementations, user presence may be monitored, via gaze sensing, to determine if a display of the HMD should be active or inactive. For example, if user presence is detected, a display of an HMD may be turned on. Likewise, if user presence is not detected, a display of an HMD may be turned off.

Some implementations involve computer-implemented techniques that monitor for user presence (e.g., is the user currently wearing an HMD) to determine if an HMD display should be active or inactive. Initial user presence may be detected based on detecting gaze, which is a relatively strong indicator of actual user presence. In some implementations, after initially detecting that a user is present, the user's continuing presence is detected using detection processes that detect user presence even when the user closes their eyes (e.g., to blink, rest, or meditate), so long as the user continues wearing the HMD. Whether user presence continues or not thus may be based on criteria other than gaze detection. Continued user presence may be detected using proximity sensor data monitoring for a body portion or region such as, inter alia, a facial portion or region of the user (e.g., the user's forehead, face, etc.), an upper body portion or region of the user (e.g., a neck or shoulder region, etc.), or a torso region (via torso tracking for a chest or abdominal region, etc.) that is close to the HMD. However, such a proximity test (if used alone) may undesirably misidentify circumstances in which the HMD is not being worn (e.g., when in bag or on a surface/desk) based on the proximity sensor detecting something close to the HMD. These circumstances may be addressed by additional data and tests, e.g., depth occlusion, proximity, world tracking, near static depth, static motion, etc.

In some implementations, an initial user presence (e.g., with respect to wearing an HMD) may be detected based on obtaining sensor data, such as gaze data, to detect gaze of a user thereby providing an indicator of actual user presence with respect to the HMD. Subsequent to detecting the initial user presence, user presence monitoring may continue using gaze and/or other sensor data. For example, user presence monitoring may continue even during instances when the user closes their eyes (e.g., to blink, rest, meditate, etc.) using non-gaze sensor data. The user presence technique may continue to determine that the user is present as long as the user continues to wear the HMD. In some implementations, user presence is based on criteria other than gaze detection. For example, continued user presence may be detected using proximity sensor data monitoring for a body portion or region such as, inter alia, a facial portion or region of the user (e.g., the user's forehead, face, etc.), an upper body portion or region of the user (e.g., a neck or shoulder region, etc.), or a torso region (via torso tracking for a chest or abdominal region, etc.) that is close to the HMD. Monitoring a body portion of the user may include utilizing sensors of the HMD (e.g., inward facing cameras, downward facing cameras, etc.) to detect a face, chest, shoulders, abdominal region, etc. of the user located proximate to the HMD.

In some implementations, using only proximity sensor data for monitoring for a body portion of the user may misinterpret circumstances in which the HMD is not being worn based on a proximity sensor detecting a non-user object(s) that is close to the HMD. Detecting a non-user object(s) that is close to the HMD may include detecting a portion of a bag or container surrounding the HMD and/or detecting a surface e.g., (of a floor, desk, table, or other furniture) upon which the HMD is placed. The aforementioned circumstances may be addressed by performing a monitoring process associated with using additional data such as, inter alia, depth occlusion data, proximity data, world tracking data, near static depth data, static motion data, etc.

In some implementations, the HMD is configured to monitor for user presence with respect to the HMD (e.g., is the user currently wearing an HMD) to determine if a display of the HMD should be in an active state or an inactive state. In some implementations, an initial user presence may be detected based on criteria used to determine that an object is proximate to the HMD (e.g., in an eye-box region) and to distinguish circumstances in which the object is the user from alternative circumstances such as, inter alia, the object is in its case or resting on a surface (e.g., of a desk) with another object positioned in front of a proximity sensor. Distinguishing circumstances may involve using criteria to determine (e.g., when object proximity is detected) whether the HMD is in a container such as a case and whether the HMD is on a non-user surface such as a surface of a desk. Conversely, conclusion of user presence may be determined based on detecting that object proximity has been lost, (b) the HMD is in a container, or (c) the HMD is on a non-user surface.

In some implementations, an HMD has a processor (e.g., one or more processors) that executes instructions stored in a non-transitory computer-readable medium to perform a method. The method performs one or more steps or processes. In some implementations, the HMD obtains first sensor data from a first sensor on the HMD. The sensor is configured to capture sensor data corresponding to an eye box region in front of at least one display of the HMD. Based on the sensor data, a gaze of a user of the HMD is detected. Based on detecting the gaze, an initial user presence corresponding to a user wearing the HMD is detected. Based on determining the initial user presence, the at least one display of the HMD is activated by changing a state of the at least one display from an inactive state to an active state.

In some implementations, an HMD has a processor (e.g., one or more processors) that executes instructions stored in a non-transitory computer-readable medium to perform a method. The method performs one or more steps or processes. In some implementations, the HMD obtains first sensor data and second sensor data based on one or more sensors. Based on the first sensor data, an object is detected within a threshold distance of the HMD and based on the second sensor data it is determined whether detecting of the object corresponds to a user wearing the HMD or a circumstance different than the user wearing the HMD. In some implementations, based on determining whether the detecting of the object corresponds to the user wearing the HMD or the circumstance different than the user wearing the HMD, the at least one display of the HMD is activated or deactivated by changing a state of the at least one display.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 6 is a flowchart representation of an exemplary method that uses gaze detection to monitor for user presence, in accordance with some implementations.

FIG. 7 is a flowchart representation of an exemplary method that uses proximity detection to monitor for user presence, in accordance with some implementations.

FIG. 8 is a block diagram of an electronic device of in accordance with some implementations.

Figure 1:
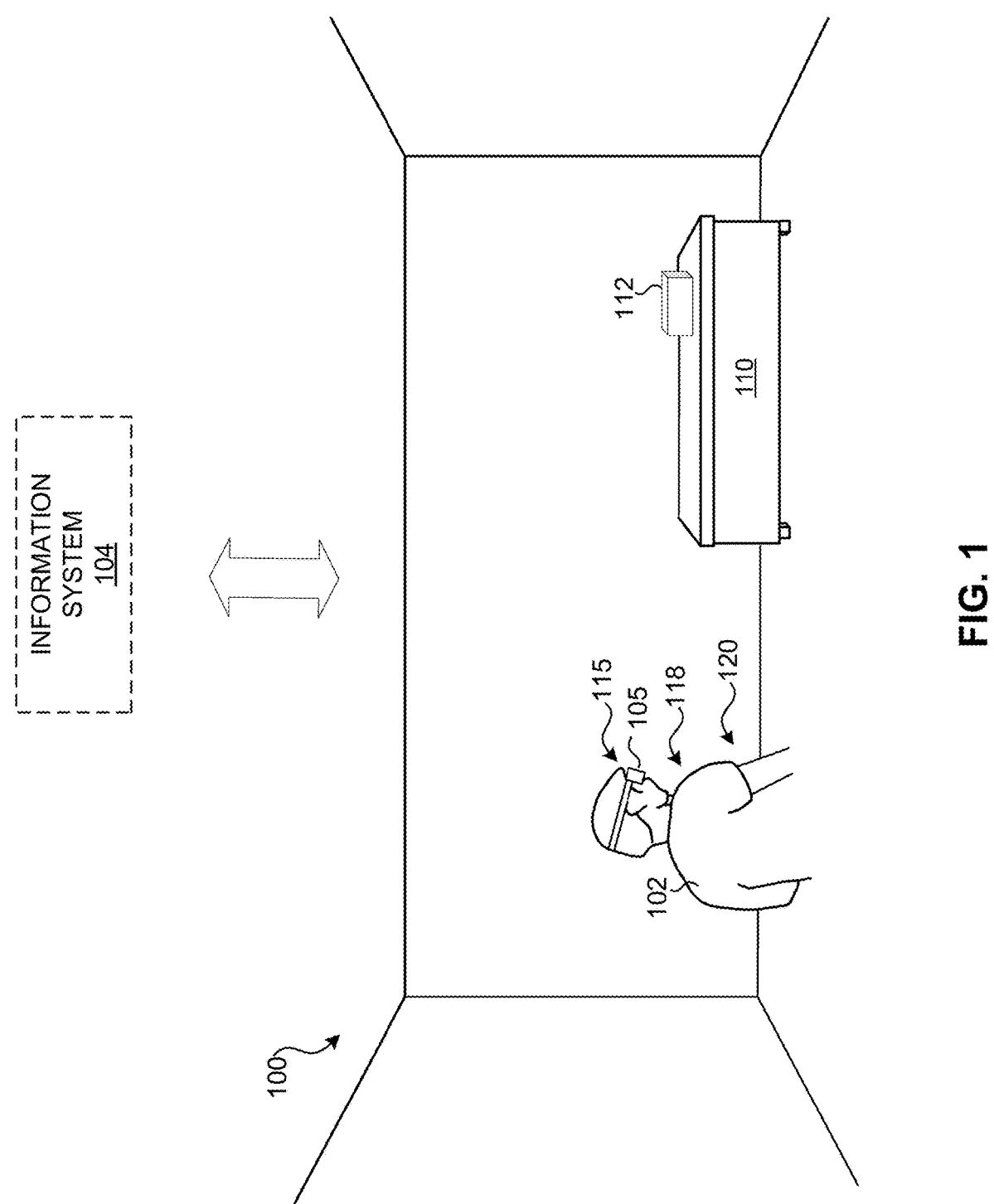
FIG. 1 illustrates an exemplary electronic device operating in a physical environment corresponding to an extended reality (XR) environment, in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 105 operating in a physical environment 100 corresponding to an extended reality (XR) environment. Additionally, electronic device 105 may be in communication with an information system 104 (e.g., a device control framework or network). In an exemplary implementation, electronic device 105 is sharing information with the information system 104. In the example of FIG. 1, the physical environment 102 is a room that includes physical objects such as a desk 110 and a container 112 (e.g., a case) for housing electronic device 105. The electronic device 105 may include one or more cameras, microphones, depth sensors, or other sensors that can be used to capture information about and evaluate the physical environment 100 and the objects within it, as well as information about the user 102 of electronic device 105. The information about the physical environment 100 and/or user 102 may be used to provide visual and audio content and/or to identify the current location of the physical environment 100 and/or the location of the user within the physical environment 100.

In some implementations, views of an extended reality (XR) environment may be provided to one or more participants (e.g., user 102 and/or other participants not shown) via electronic device 105 (e.g., a wearable device such as an HMD). Such an XR environment may include views of a 3D environment that is generated based on camera images and/or depth camera images of the physical environment 100 as well as a representation of user 102 based on camera images and/or depth camera images of the user 102. Such an XR environment may include virtual content that is positioned at 3D locations relative to a 3D coordinate system associated with the XR environment, which may correspond to a 3D coordinate system of the physical environment 100.

In some implementations, an electronic device such as an HMD (e.g., device 105) may be configured to monitor (via gaze sensing) for user presence (e.g., is user 102 currently wearing an HMD) to determine if a display(s) of the HMD should be placed in an active state or inactive state. For example, if user presence is detected, the display(s) of the HMD may remain on or be turned on so that the user may view rendered content via the HMD. Likewise, if user presence is not or no longer detected, the display(s) of the HMD may be turned off to, for example, prevent unauthorized use of the HMD, conserve battery/power of the HMD, etc.

In some implementations, user presence monitoring may include obtaining sensor data (e.g., gaze data) from a sensor on the HMD. In some implementations the sensor data may be obtained based on triggering a user active state in response to detecting applied activity criteria. For example, applied activity criteria may include an HMD lift to wake criteria, a user action with respect to a physical control device on the HMD criteria, etc. In some implementations, the sensor may be a gaze sensor configured to capture sensor data corresponding to an eye box region in front of a display(s) of the HMD. In response, a gaze of a user (e.g., user 102) of the HMD may be detected based on the sensor data. The detected gaze of the user may be used to determine an initial user presence corresponding to the user wearing the HMD. In response to determining the initial user presence, a state of the display(s) may be changed from an inactive state to an active state. (e.g., the display is powered up).

In some implementations, a continued user presence associated with the user continuing to wear the HMD may be determined based on additional sensor data obtained from an additional sensor(s) of the HMD. In some implementations, the additional sensor(s) may be a proximity sensor configured to monitor for a body portion or region of user 102 such as, inter alia, a facial portion or region 115 (e.g., the user's forehead, face, etc.), an upper body portion or region 118 (e.g., the user's neck or shoulder region, etc.), or a torso region 120 (via torso tracking for a chest or abdominal region, etc.) that is within a threshold distance of the HMD. In this instance, continued user presence may be detected even when eyes of the user are closed while wearing the HMD.

In some implementations, the continued user presence may be detected in response to assessing criteria corresponding to determining whether the HMD is located in a container such as, inter alia, a case, a bag, etc. Criteria may include gaze detection criteria, depth occlusion criteria, proximity criteria, world tracking criteria, etc. In some implementations, it may be detected that the HMD is no longer located within the container based on further sensor-based criteria.

In some implementations, the continued user presence may be detected in response to assessing criteria corresponding to determining whether the HMD is located on a non-user surface such as, inter alia, a desk, furniture, etc. Criteria may include gaze detection criteria, near visual depth criteria, static or active motion criteria, etc. In some implementations, it may be detected that the HMD is no longer located on a non-user surface based on further sensor-based criteria.

In some implementations, an electronic device such as an HMD (e.g., device 105) may be configured to monitor (via proximity sensing) for user presence (e.g., is user 102 currently wearing an HMD) to determine if a display(s) of the HMD should be placed in an active state or inactive state. User presence monitoring may include obtaining proximity sensor data and depth or world-tracking data from one or more associated sensors.

In some implementations an object may be detected within a threshold distance of the HMD based on the proximity data. For example, proximity detection may include detecting whether there is an object within, inter alia, an eye box region, a wearer face region, a wearer upper torso region, etc.

In some implementations, it may be determined (based on the depth or world-tracking data) whether detecting the object corresponds to a user wearing the HMD or a circumstance differing than the user wearing the HMD. In some implementations (based on the aforementioned determination), a display(s) of the HMD may be activated or deactivated the by changing a state of the display(s). For example, the display(s) may be tuned on or off.

Figure 2:
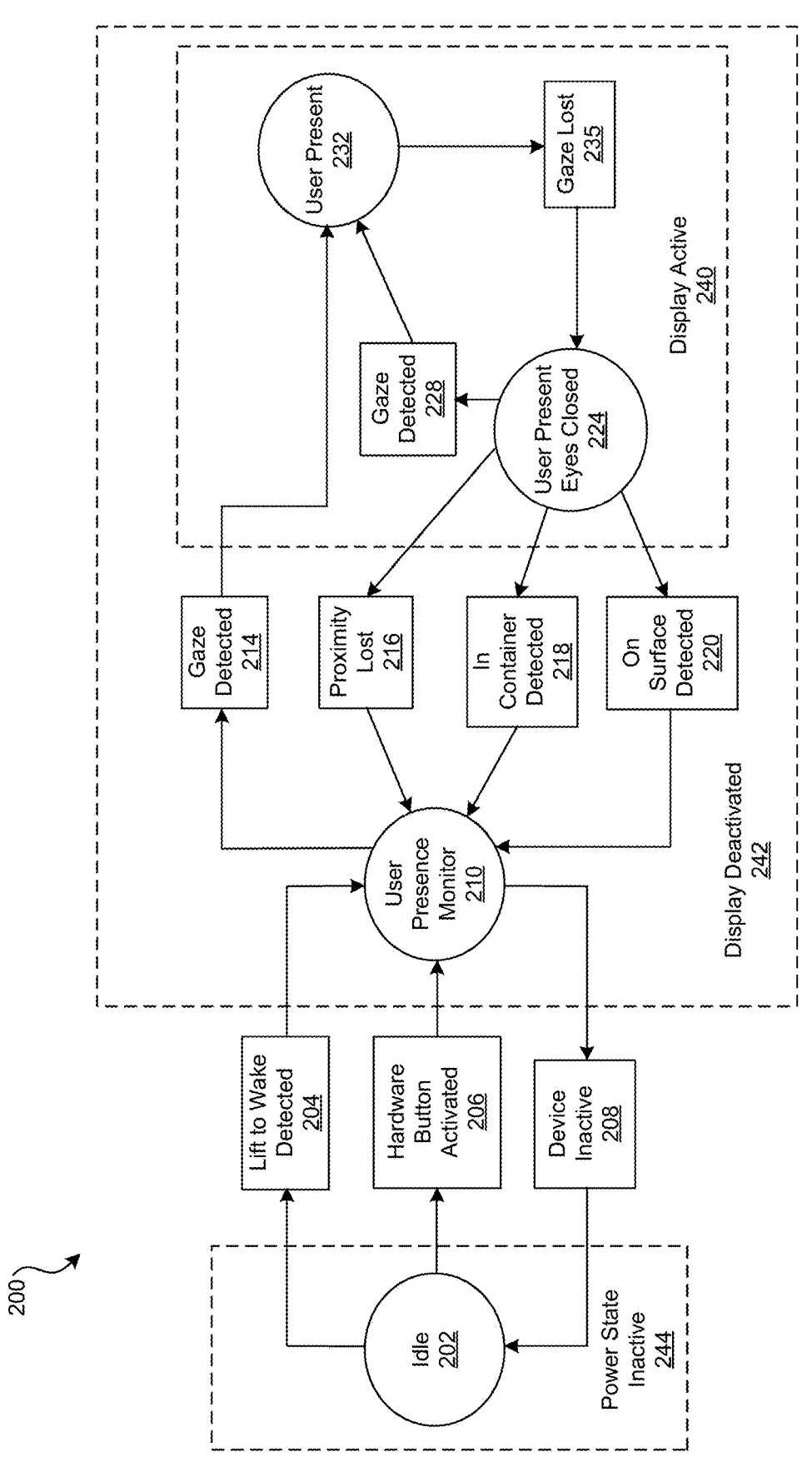
FIG. 2 illustrates a gaze-based state sequence associated with monitoring for user presence, in accordance with some implementations.

FIG. 2 illustrates a gaze-based state sequence 200 associated with monitoring for user presence to determine if a display of an HMD (e.g., electronic device 105 of FIG. 1) should be in an active state or an inactive state, in accordance with some implementations. At an initial instant in time prior to executing state sequence 200, an HMD is initially in an idle state 202 (e.g., in a sleep state) such that a power state of the HMD is inactive 244. For example, a display (or displays) of the HMD is deactivated (e.g., the display has been turned off), the HMD is in a sleep state, and cameras of the HMD are not active. Subsequently, state sequence 200 is executed as follows:

In blocks 204 and 206, a user active state of the HMD is triggered based on detecting applied activity criteria. Applied activity criteria may be a lift to wake criteria (e.g., if the device is lifted up or moved) as illustrated with respect to block 204. Alternatively, applied activity criteria may be a user action detection with respect to physical control device criteria (e.g., activating a hardware button) on the HMD as illustrated with respect to block 206.

In response to the user active state of the HMD being triggered, a display deactivated state 242 is initiated such that a display(s) of the HMD is deactivated but the HMD and cameras are active (e.g., awake). The display deactivated state 242 enables a user presence monitor 210 to trigger a gaze sensor (on the HMD) to capture gaze sensor data corresponding to an eye box region in front of the display(s) of the HMD. The gaze sensor data enables detection of a gaze (e.g., with respect to one or two eyes) of a user (e.g., user 102 of FIG. 1) of the HMD as illustrated with respect to block 214. If gaze is detected in block 214, it is determined that a user is present as illustrated with respect to user present state 232 and a display(s)) of the HMD remains in an active state 240 (e.g., the display remains on). If gaze is lost as illustrated in block 235, a monitor 224 is enabled thereby triggering a process to determine if a user is present with their eyes closed. If gaze is again detected (e.g., the user: blinked, was resting, or was meditating) as illustrated in block 228, it may be determined that the user is present as illustrated with respect to user present state 232 and the display(s)) of the HMD remains in an activate state 240. If gaze remains lost, monitor 224 triggers a process to determine if (a) proximity is lost as illustrated with respect to block 216; (b) an in-container (e.g., in bag) state is detected as illustrated with respect to block 218 and further described with respect to FIG. 3, infra; or (c) an on surface/on desk state is detected as illustrated with respect to block 220 and further described with respect to FIG. 4, infra. If it is determined that proximity is lost, an in-container state is detected, or an on surface/on desk state is detected, then user presence monitor 210 triggers a device inactive state as illustrated with respect to block 208 and an idle state 202 is initiated such that a power state of the HMD is inactive 244. For example, a display (or displays) of the HMD is deactivated (e.g., the display has been turned off), the HMD is in a sleep state, and cameras of the HMD are not active.

Figure 3:
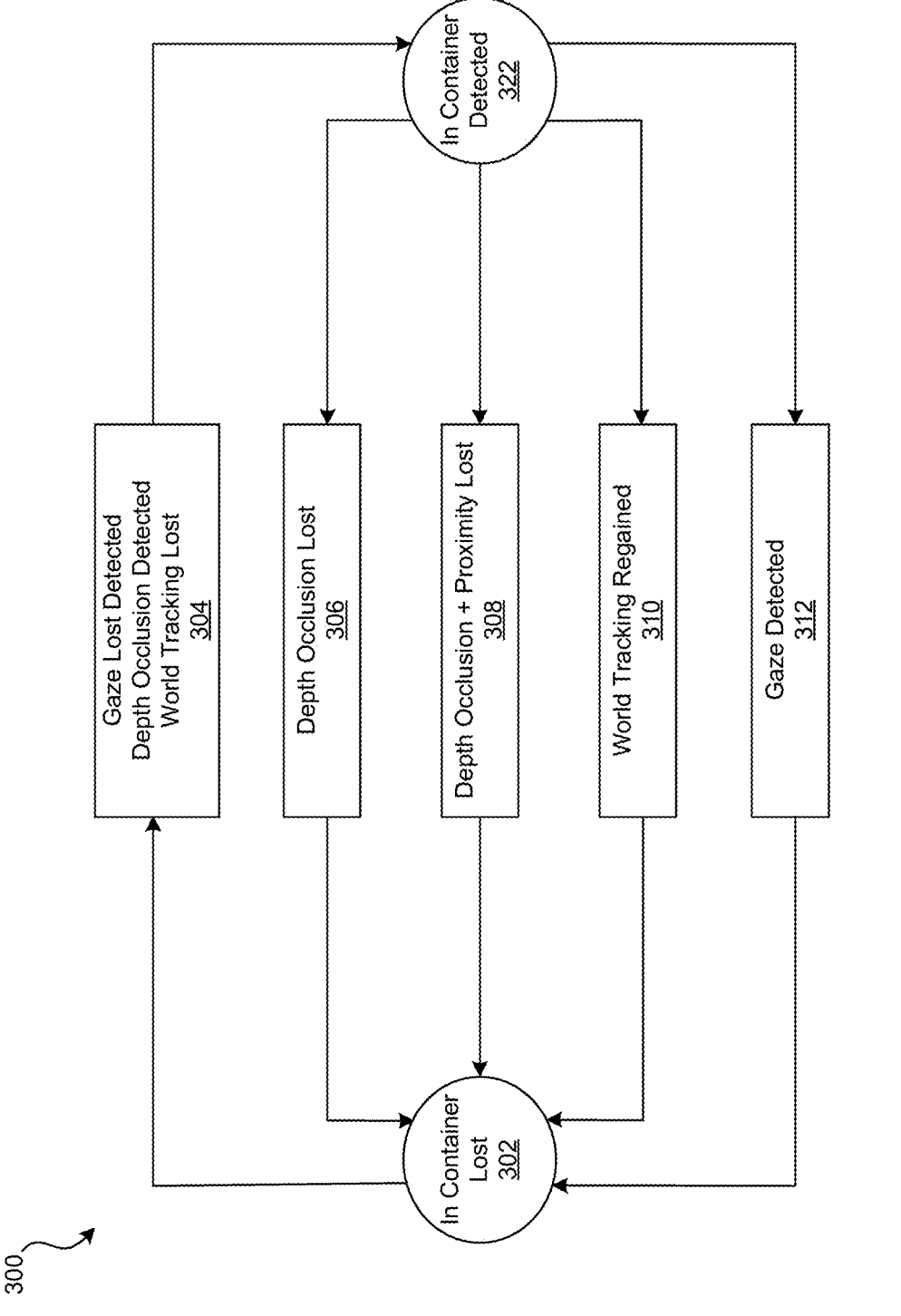
FIG. 3 illustrates an algorithm associated with assessing in container criteria corresponding to determining whether an HMD is in a container, in accordance with some implementations.

FIG. 3 illustrates an expanded view of block 218 of FIG. 2 representing an algorithm 300 associated with assessing in container criteria 304 corresponding to determining if an HMD is in a container, in accordance with some implementations. For example, algorithm 300 may be implemented to determine if a user has placed an HMD in a storage or carrying case thereby triggering a display of the HMD to be placed in an inactive state to, inter alia, prevent unnecessary battery usage during storage, prevent potential heat buildup within the case, etc. Assessing in container criteria 304 may result in triggering an in container detected state 322 or an in container lost state 302.

In some implementations, in container criteria 304 triggering an in container detected state 322 may include: gaze detection criteria associated with gaze data, depth occlusion criteria associated with front facing depth sensor and ambient lighting conditions data, proximity criteria associated with detecting an object proximate to the HMD, world tracking criteria associated with a visual depth of a surrounding area, etc.

In some implementations, assessing in container criteria 304 triggering an in container detected state 322 may include determining that the following has occurred: (a) gaze detection has been lost for a threshold amount of time (e.g., between approximately 5-20 seconds); (b) depth occlusion has been detected for a threshold amount of time (e.g., between approximately 5-20 seconds); and world tracking has been lost for a threshold amount of time (e.g., between approximately 5-20 seconds).

In some implementations, the HMD may be detected to no longer be within a container based on assessing in container lost criteria. Assessing in container lost criteria may result in triggering an in container lost state 302 by determining that the following has occurred: (a) depth occlusion has been lost for a threshold amount of time as illustrated with respect to block 306; (b) depth occlusion has occurred and proximity has been lost as illustrated with respect to block 308; (c) world tracking has been regained as illustrated with respect to block 310, or (d) gaze has been detected as illustrated with respect to block 312.

Figure 4:
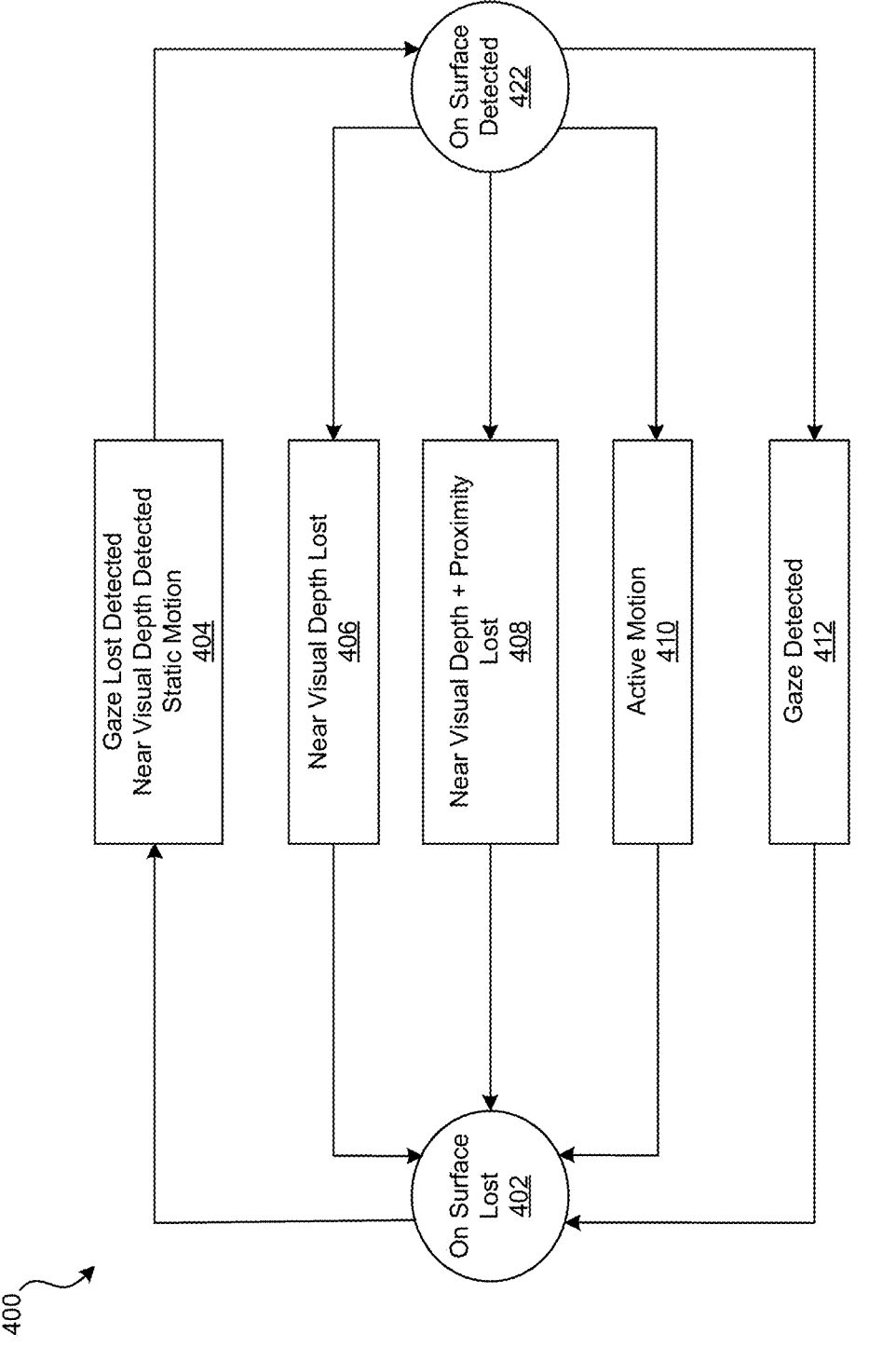
FIG. 4 illustrates an algorithm associated with assessing on surface criteria corresponding to determining whether an HMD is on a non-user surface, in accordance with some implementations.

FIG. 4 illustrates an expanded view of block 220 of FIG. 2 representing an algorithm 400 associated with assessing on surface criteria 404 corresponding to determining whether an HMD is on a non-user surface, in accordance with some implementations. For example, algorithm 400 may be implemented to determine if a user has placed an HMD on a surface of a desk thereby triggering a display of the HMD to be placed in an inactive state to, inter alia, prevent unnecessary battery usage while sitting idle, prevent an unauthorized user from using the HMD to access user content, etc. Assessing on surface criteria 404 may result in triggering an on surface detected state 422 or an on surface lost state 402.

In some implementations, on surface criteria 404 triggering an on surface detected state 422 may include: gaze detection criteria associated with gaze data, near visual depth criteria associated with objects or elements that are close to a viewing user, static or active motion (associated with stable or active user motion) criteria, etc.

In some implementations, assessing on surface criteria 404 triggering an on surface detected state 422 may include determining that the following has occurred: (a) gaze detection has been lost for a threshold amount of time (e.g., between approximately 5-20 seconds); (b) near visual depth has been detected for a threshold amount of time (e.g., between approximately 5-20 seconds); and static motion has occurred for a threshold amount of time (e.g., between approximately 5-20 seconds).

In some implementations, the HMD may be detected to no longer be on the non-user surface based on assessing on surface lost criteria. Assessing on surface lost criteria may result in triggering an on surface lost state 402 by determining that the following has occurred: (a) near visual depth has been lost for a threshold amount of time as illustrated with respect to block 406; (b) near visual depth has occurred and proximity has been lost as illustrated with respect to block 408; (c) active motion has occurred as illustrated with respect to block 410, or (d) gaze has been detected as illustrated with respect to block 412.

Figure 5:
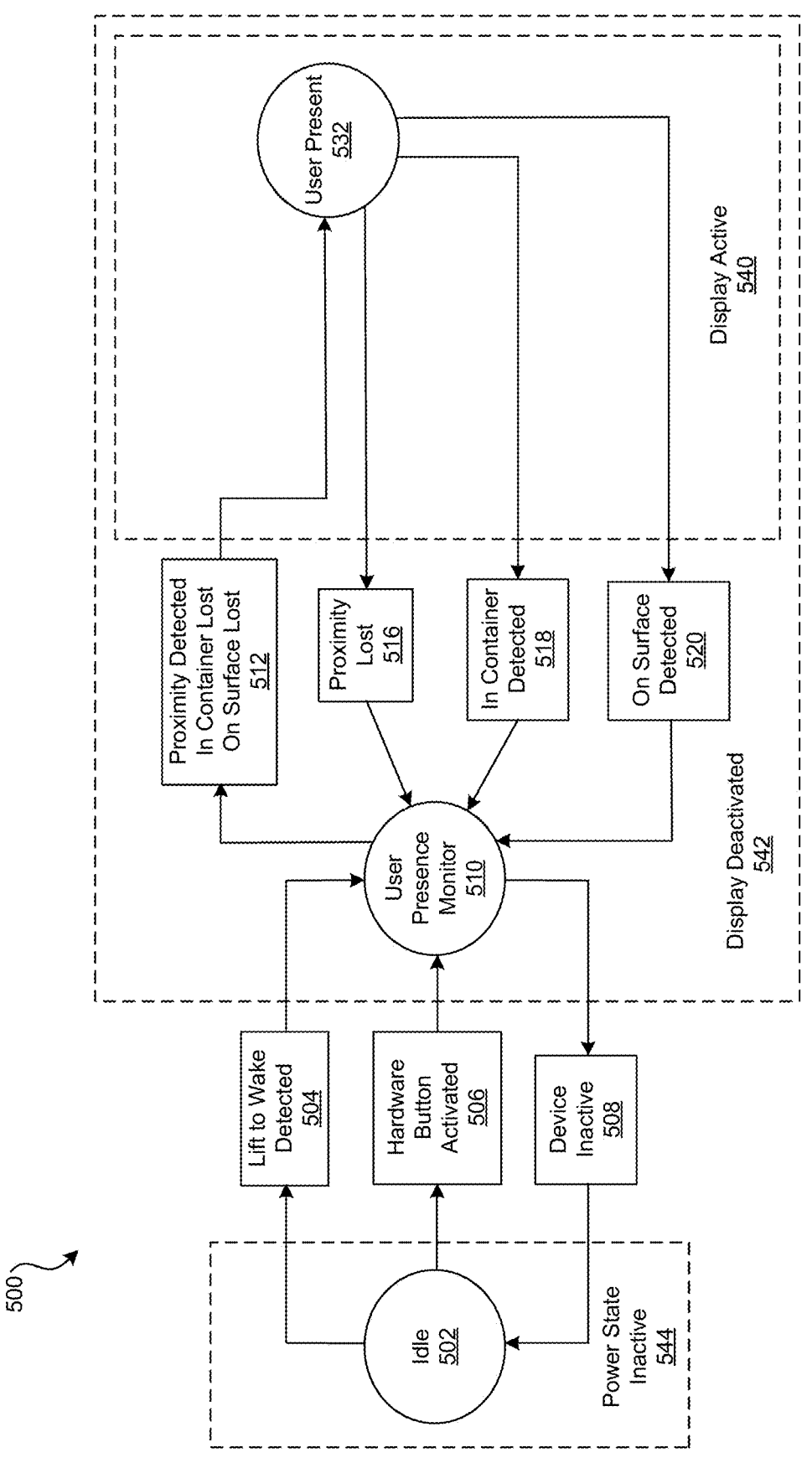
FIG. 5 illustrates a proximity-based state sequence associated with monitoring for user presence, in accordance with some implementations.

FIG. 5 illustrates a proximity-based state sequence 500 associated with monitoring for user presence to determine if a display of an HMD (e.g., electronic device 105 of FIG. 1) should be in an active state or an inactive state, in accordance with some implementations. At an initial instant in time prior to executing state sequence 500, an HMD is initially in an idle state 502 (e.g., in a sleep state) such that a power state of the HMD is inactive 544. For example, a display (or displays) of the HMD is deactivated (e.g., the display has been turned off), the HMD is in a sleep state, and cameras of the HMD are not active. Subsequently, state sequence 500 is executed as follows:

In blocks 504 and 506, a user active state of the HMD is triggered based on detecting applied activity criteria. Applied activity criteria may be a lift to wake criteria (e.g., if the device is lifted or moved) as illustrated with respect to block 504. Alternatively, the applied activity criteria may be a user action detection with respect to physical control device criteria (e.g., activating a hardware button) on the HMD as illustrated with respect to block 506.

In response to the user active state of the HMD being triggered, a display deactivated state 542 is initiated such that a display(s) of the HMD is deactivated but the HMD and cameras are active (e.g., awake). The display deactivated state 542 enables a user presence monitor 510 to trigger sensors (on the HMD) to capture sensor data such as proximity data to detect an object proximate to the HMD as illustrated with respect to block 512. For example, the sensor data may enable a proximity detection detecting whether there is an object within an eye box region, a wearer face region, and/or a wearer torso region. In some implementations, it may be determined whether detecting the object corresponds to a user wearing the HMD or a circumstance different than the user wearing the HMD (e.g., the HMD is on a surface such as a desk or in a container such as a case).

In some implementations, it may determined that the object corresponds to a user wearing the HMD based on an in container lost criteria and an on surface lost criteria as illustrated with respect to block 512 thereby verifying that a user is present with respect to user present state 532 and a display(s)) of the HMD remains in an active state 240 (e.g., the display remains on).

In some implementations, detecting the object proximate to the HMD may correspond to the user wearing the HMD based on the in container lost criteria and assessing the in container lost criteria may include determining that: (a) world tracking is available; (b) depth occlusion is detected while object proximity is lost; or (c) depth occlusion is lost for a threshold amount of time (e.g., between approximately 5-20 seconds).

In some implementations detecting the object proximate to the HMD may correspond to the user wearing the HMD based on the on surface lost criteria and assessing the on surface lost criteria may include determining that: (a) active motion is available, (b) near visual depth is available while object proximity is lost, or (c) near visual depth is lost for a threshold amount of time (e.g., between approximately 5-20 seconds).

In some implementations, it may be determined that the user is not wearing the HMD based on no longer detecting the object (i.e., proximity lost) as illustrated in block 516 and therefore user presence monitor 510 triggers a device inactive state as illustrated with respect to block 508 and idle state 502 is triggered such that such that a power state of the HMD is inactive 544. For example, a display (or displays)

of the HMD is deactivated (e.g., the display has been turned off), the HMD is in a sleep state, and cameras of the HMD are not active.

In some implementations, it may be determined that the user is not wearing the HMD based on detecting that the object corresponds to a circumstance other than the user wearing the HMD based on in container detected criteria as illustrated in block 518. Subsequently assessing the in container detected criteria may include determining that: (a) depth occlusion is detected for a threshold amount of time; and (b) world tracking is lost for a threshold amount of time. Determining that the user is not wearing the HMD triggers user presence monitor 510 to enable a device inactive state as illustrated with respect to block 508 and idle state 502 is triggered such that such that a power state of the HMD is inactive 544. For example, a display (or displays) of the HMD is deactivated (e.g., the display has been turned off), the HMD is in a sleep state, and cameras of the HMD are not active.

In some implementations, it may be determined that the user is not wearing the HMD based on detecting that the object corresponds to a circumstance other than the user wearing the HMD in response to on surface detected criteria as illustrated in block 520. Subsequently assessing on surface detected criteria may include determining that: (a) near visual depth is available for a threshold amount of time; or (b) static motion is detected for a threshold amount of time. Determining that the user is not wearing the HMD triggers user presence monitor 510 to enable a device inactive state as illustrated with respect to block 508 and idle state 502 is triggered such that such that a power state of the HMD is inactive 544. For example, a display (or displays) of the HMD is deactivated (e.g., the display has been turned off), the HMD is in a sleep state, and cameras of the HMD are not active.

FIG. 6 is a flowchart representation of an exemplary method 600 that uses gaze detection to monitor for user presence to determine if a display of an HMD should be in an active state or an inactive state, in accordance with some implementations. In some implementations, the method 600 is performed by a device(s), such as a tablet device, mobile device, desktop, laptop, HMD, server device, information system, etc. In some implementations, the device has a screen for displaying images and/or a screen for viewing stereoscopic images such as a head-mounted display (HMD such as e.g., device 105 of FIG. 1). In some implementations, the method 600 is performed by processing logic, including hardware, firmware, software, or a combination thereof. In some implementations, the method 600 is performed by a processor executing code stored in a non-transitory computer-readable medium (e.g., a memory). Each of the blocks in the method 600 may be enabled and executed in any order.

At block 602, the method 600 obtains first sensor data (e.g., gaze data) from a first sensor on an HMD. The first sensor is configured to capture sensor data corresponding to an eye box region in front of at least one display of the HMD. For example, a gaze sensor on HMD (such as device 105 in FIG. 1) may capture gaze sensor data corresponding to an eye box region in front of the display(s) of an HMD as described with respect to FIG. 2. In some implementations, the first sensor data may be obtained based on triggering a user active state in response to detecting an applied activity criteria that may include: detecting lift to wake; or detecting user action on a physical control device on the HMD as described with respect to blocks 204 and 206 of FIG. 2.

At block 604, the method 600 detects a gaze of a user (e.g., user 102 of FIG. 1) of the HMD based on the sensor data retrieved at block 602. For example, gaze sensor data may enable detection of a gaze (e.g., with respect to one or two eyes) of a user (e.g., user 102 of FIG. 1) of HMD as described with respect to FIG. 2.

At block 606, the method 600 determines an initial user presence corresponding to a user wearing the HMD. The initial user presence may be determined based on detecting the gaze of the user. For example, if gaze is detected, it may determined that a user is present as illustrated with respect to a user present state 232 as described with respect to FIG. 2.

At block 608, the method 600 activates a display(s) of the HMD by changing a state of the display(s) from an inactive state to an active state based on determining the initial user presence. For example, a display(s)) of the HMD may remain in an active state 240 (e.g., the display remains on) or be placed in a power inactive state 244 as described with respect to FIG. 2.

In some implementations, a continued user presence in which the user continues wearing the HMD may be determined based on second sensor data from a second sensor of the HMD. For example, the second sensor may be a proximity sensor configured to monitor for proximity data associated with a body portion or region of the user 102 such as a facial portion or region 115 (e.g., the user's forehead, face, etc.), an upper body portion or region 118 (e.g., the user's neck or shoulder region, etc.), or a torso region 120 (via torso tracking for a chest or abdominal region, etc.) that is detected within a threshold distance of the HMD as described with respect to FIG. 1. In some implementations the continued user presence may be detected when eyes of the user are closed while wearing the HMD.

In some implementations, the continued user presence may be detected based on assessing in container criteria corresponding to determining whether the HMD is in a container such as a case or a bag. In container criteria may include: gaze detection criteria; depth occlusion criteria; proximity criteria; and world tracking criteria. For example, in container criteria 304 may trigger an in container present state 322 as described with respect to FIG. 3.

In some implementations, assessing in container criteria may include determining that: gaze detection is lost for a first threshold amount of time; depth occlusion is detected for a second threshold amount of time; and world tracking is lost for a third threshold amount of time as described with respect to block 304 of FIG. 3.

In some implementations, the HMD may be detected to no longer be in the container based on in container lost criteria. Subsequently assessing in container lost criteria may include determining that: depth occlusion is lost for a fourth threshold amount of time; depth occlusion occurs and proximity is lost; world tracking is regained; or gaze is detected thereby triggering an in container lost state 302 as described with respect to FIG. 3.

In some implementations, continued user presence may be detected based on assessing on surface criteria corresponding to determining whether the HMD is on a non-user surface such as a desk 110 as described with respect to FIG. 1. In some implementations, on surface criteria may include: gaze detection criteria; near visual depth criteria; and static or active motion criteria. In some implementations, the in container criteria may be assessed by determining that: gaze detection is lost for a first threshold amount of time; near visual depth is detected for a second threshold amount of time; and static motion occurs for a third threshold amount of time thereby triggering an on surface detected state 422 as described with respect to FIG. 4.

In some implementations, the HMD may be detected to no longer be on the non-user surface based on surface lost criteria and the non-surface lost criteria may be assessed to determine that: near visual depth lost is lost for a fourth threshold amount of time; near visual depth occurs and proximity is lost; active motion occurs; or gaze is detected thereby triggering on surface lost state 402 as described with respect to FIG. 4.

FIG. 7 is a flowchart representation of an exemplary method 700 that uses proximity detection to monitor for user presence to determine if a display of an HMD should be in an active state or an inactive state, in accordance with some implementations. In some implementations, the method 700 is performed by a device(s), such as a tablet device, mobile device, desktop, laptop, HMD, server device, information system, etc. In some implementations, the device has a screen for displaying images and/or a screen for viewing stereoscopic images such as a head-mounted display (HMD such as e.g., device 105 of FIG. 1). In some implementations, the method 700 is performed by processing logic, including hardware, firmware, software, or a combination thereof. In some implementations, the method 700 is performed by a processor executing code stored in a non-transitory computer-readable medium (e.g., a memory). Each of the blocks in the method 700 may be enabled and executed in any order.

At block 702, the method 700 obtains first sensor data (e.g., proximity data) and second sensor data (e.g., depth data, world-tracking data, etc.) based on one or more sensors. For example, a display deactivated state 542 may enable a user presence monitor 510 to trigger sensors (on an HMD) to capture sensor data such as proximity data to detect an object proximate to the HMD as illustrated with respect to block 512 of FIG. 5.

At block 704, the method 700 detects an object within a threshold distance of the HMD based on the first sensor data. For example, proximity detection may be executed to detect whether there is an object within an eye box region, a wearer face region, and/or a wearer upper torso region as described with respect to FIG. 5. In some implementations, detecting the object within the threshold distance of the HMD may include detecting the object within: an eye-box region of the HMD; a wearer face region; or a wearer upper torso region as described with respect to FIG. 5.

At block 706, the method 700, determines (based on the second sensor data) whether detecting the object corresponds to a user wearing the HMD or a circumstance different than the user wearing the HMD. For example, a circumstance different than a user wearing an HMD may be that the HMD is on a surface such as a desk or in a container such as a case as described with respect to FIG. 5. In some implementations the first sensor and second sensor data may be obtained based on triggering a user active state in response to detecting an applied activity criteria that may include: detecting lift to wake; or detecting user action on a physical control device on the HMD as described with respect to blocks 504 and 506 of FIG. 5.

In some implementations, the method 700 may determine that detecting the object corresponds to the user wearing the HMD based on not in container criteria and/or not on surface criteria. For example, it may determined that the object corresponds to a user wearing an HMD based on in container lost criteria and on surface lost criteria as illustrated with respect to block 512 of FIG. 5.

In some implementations, the method 700 may determine that detecting the object corresponds to the user wearing the HMD based on not in container criteria assessed to determine that: world tracking is available; depth occlusion is detected while object proximity is lost; or depth occlusion is lost for a first threshold amount of time as described with respect to FIG. 5.

In some implementations, the method 700 may determine that detecting the object corresponds to the user wearing the HMD based on not on surface criteria assessed to determine that: active motion is available; near visual depth is available while object proximity is lost; or near visual depth is lost for a second threshold amount of time as described with respect to FIG. 5.

In some implementations, the method 700 may determine that the user is not wearing the HMD based on no longer detecting the object thereby corresponding to a circumstance other than the user wearing the HMD based: on in container criteria; and on surface criteria as illustrated with respect to block 518 and block 520 of FIG. 5.

In some implementations, the method 700 may determine that detecting the object corresponds to the circumstance other than the user wearing the HMD based on in container criteria assessed to determine that: depth occlusion is detected for a first threshold amount of time; and world tracking is lost for a second threshold amount of time as described with respect to FIG. 5.

In some implementations, the method 700 may determine that detecting the object corresponds to the user wearing the HMD based on surface criteria assessed to determine that: near visual depth is available for a third threshold amount of time; or static motion is detected for a fourth threshold amount of time as described with respect to FIG. 5.

At block 708, the method 700, activates or deactivates (based on determining whether the detecting of the object corresponds to the user wearing the HMD or the circumstance different than the user wearing the HMD) a display(s) of the HMD by changing a state of the at least one display. For example, a user presence monitor 510 may be configured to place the HMD in a HMD power inactive state 544 such that the display(s) has been turned off as described with respect to FIG. 5.

FIG. 8 is a block diagram of an example device 800. Device 800 illustrates an exemplary device configuration for electronic device 105 of FIG. 1. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units 802 (e.g., microprocessors, ASICs, FPGAs, GPUs, CPUs, processing cores, and/or the like), one or more input/output (I/O) devices and sensors 804, one or more communication interfaces 808 (e.g., USB, FIREWIRE, THUNDERBOLT, IEEE 802.3x, IEEE 802.11x, IEEE 802.14x, GSM, CDMA, TDMA, GPS, IR, BLUETOOTH, ZIGBEE, SPI, I2C, and/or the like type interface), one or more programming (e.g., I/O) interfaces 810, output devices (e.g., one or more displays) 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), one or more cameras (e.g., inward facing cameras and outward facing cameras of an HMD), one or more infrared sensors, one or more heat map sensors, and/or the like.

In some implementations, the one or more displays 812 are configured to present a view of a physical environment, a graphical environment, an extended reality environment, etc. to the user. In some implementations, the one or more displays 812 are configured to present content (determined based on a determined user/object location of the user within the physical environment) to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 800 includes a single display. In another example, the device 800 includes a display for each eye of the user.

In some implementations, the one or more image sensor systems 814 are configured to obtain image data that corresponds to at least a portion of the physical environment 100. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

In some implementations, sensor data may be obtained by device(s) (e.g., devices 105 and 110 of FIG. 1) during a scan of a room of a physical environment. The sensor data may include a 3D point cloud and a sequence of 2D images corresponding to captured views of the room during the scan of the room. In some implementations, the sensor data includes image data (e.g., from an RGB camera), depth data (e.g., a depth image from a depth camera), ambient light sensor data (e.g., from an ambient light sensor), and/or motion data from one or more motion sensors (e.g., accelerometers, gyroscopes, IMU, etc.). In some implementations, the sensor data includes visual inertial odometry (VIO) data determined based on image data. The 3D point cloud may provide semantic information about one or more elements of the room. The 3D point cloud may provide information about the positions and appearance of surface portions within the physical environment. In some implementations, the 3D point cloud is obtained over time, e.g., during a scan of the room, and the 3D point cloud may be updated, and updated versions of the 3D point cloud obtained over time. For example, a 3D representation may be obtained (and analyzed/processed) as it is updated/adjusted over time (e.g., as the user scans a room).

In some implementations, sensor data may be positioning information, some implementations include a VIO to determine equivalent odometry information using sequential camera images (e.g., light intensity image data) and motion data (e.g., acquired from the IMU/motion sensor) to estimate the distance traveled. Alternatively, some implementations of the present disclosure may include a simultaneous localization and mapping (SLAM) system (e.g., position sensors). The SLAM system may include a multidimensional (e.g., 3D) laser scanning and range-measuring system that is GPS independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In some implementations, the device 800 includes an eye tracking system for detecting eye position and eye movements (e.g., eye gaze detection). For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user. Moreover, the illumination source of the device 800 may emit NIR light to illuminate the eyes of the user and the NIR camera may capture images of the eyes of the user. In some implementations, images captured by the eye tracking system may be analyzed to detect position and movements of the eyes of the user, or to detect other information about the eyes such as pupil dilation or pupil diameter. Moreover, the point of gaze estimated from the eye tracking images may enable gaze-based interaction with content shown on the near-eye display of the device 800.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 includes a gaze-based user presence detection instruction set 842 and a proximity-based user presence detection instruction set 844. The instruction set(s) 840 may be embodied as a single software executable or multiple software executables.

The gaze-based user presence detection instruction set 842 is configured with instructions executable by a processor to obtain gaze sensor data to detect gaze of a user to provide an indicator of actual user presence with respect to the HMD.

The proximity-based user presence detection instruction set 844 is configured with instructions executable by a processor to obtain proximity sensor data to detect proximity of a user with respect to an HMD to provide an indicator of actual user presence with respect to the HMD.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:

at a processor of a head mounted device (HMD):

obtaining first sensor data from a first sensor on the HMD, the first sensor configured to capture sensor data corresponding to a position of an eye of a user within an eye box region representing a 3-dimensional region in space in front of at least one display of the HMD;

based on the first sensor data, detecting a gaze of a user of the HMD;

based on detecting the gaze, determining an initial user presence corresponding to a user wearing the HMD; and based on determining the initial user presence, activating the at least one display of the HMD by changing a state of the at least one display from an inactive state to an active state.

2. The method of claim 1 further comprising determining a continued user presence in which the user continues wearing the HMD based on second sensor data from a second sensor of the HMD.

3. The method of claim 2, wherein the continued user presence is detected when eyes of the user are closed while wearing the HMD.

4. The method of claim 2, wherein the continued user presence is detected based on proximity sensor data corresponding to an object being within a threshold distance of the user, and wherein the object is detected within:

an eye-box region of the HMD;

a wearer face region; or a wearer torso region.

5. The method of claim 2, wherein the continued user presence is detected based on assessing in container criteria corresponding to determining whether the HMD is in a container.

6. The method of claim 5, wherein the in container criteria comprise:

gaze detection criteria;

depth occlusion criteria;

proximity criteria; and world tracking criteria.

7. The method of claim 5, wherein assessing the in container criteria comprises determining that:

gaze detection is lost for a first threshold amount of time;

depth occlusion is detected for a second threshold amount of time; and world tracking is lost for a third threshold amount of time.

8. The method of claim 5 further comprising detecting that the HMD is no longer in the container based on in container lost criteria, wherein assessing the in container lost criteria comprises determining that:

depth occlusion is lost for a fourth threshold amount of time;

depth occlusion occurs and proximity is lost;

world tracking is regained; or gaze is detected.

9. The method of claim 2, wherein the continued user presence is detected based on assessing a surface criteria corresponding to determining whether the HMD is on a non-user surface.

10. The method of claim 9, wherein the on surface criteria comprise:

gaze detection criteria;

near visual depth criteria; and static or active motion criteria.

11. The method of claim 9, wherein assessing the on surface criteria comprises determining that:

gaze detection is lost for a first threshold amount of time;

near visual depth is detected for a second threshold amount of time; and static motion occurs for a third threshold amount of time.

12. The method of claim 9 further comprising detecting that the HMD is no longer on the non-user surface based on surface lost criteria, wherein assessing the non-surface lost criteria comprises determining that:

near visual depth lost is lost for a fourth threshold amount of time;

near visual depth occurs and proximity is lost;

active motion occurs; or gaze is detected.

13. The method of claim 1, wherein the first sensor data is obtained based on triggering a user active state based on detecting an activity criteria, assessing the activity criteria comprising:

detecting lift to wake; or detecting user action on a physical control device on the HMD.

14. A system comprising:

a processor;

a computer readable medium storing instructions that when executed by the processor cause the processor to perform operations comprising:

obtaining first sensor data from a first sensor on the HMD, the first sensor configured to capture sensor data corresponding to a position of an eye of a user within an eye box region representing a 3-dimensional region in space in front of at least one display of the HMD;

based on the first sensor data, detecting a gaze of a user of the HMD;

based on detecting the gaze, determining an initial user presence corresponding to a user wearing the HMD; and based on determining the initial user presence, activating the at least one display of the HMD by changing a state of the at least one display from an inactive state to an active state.

15. The system of claim 14, wherein the operations further comprise determining a continued user presence in which the user continues wearing the HMD based on second sensor data from a second sensor of the HMD.

16. The system of claim 15, wherein the continued user presence is detected when eyes of the user are closed while wearing the HMD.

17. The system of claim 15, wherein the continued user presence is detected based on proximity sensor data corresponding to an object being within a threshold distance of the user, and wherein the object is detected within:

an eye-box region of the HMD;

a wearer face region; or a wearer torso region.

18. The system of claim 15, wherein the continued user presence is detected based on assessing in container criteria corresponding to determining whether the HMD is in a container.

19. The system of claim 18, wherein the in container criteria comprise:

gaze detection criteria;

depth occlusion criteria;

proximity criteria; and world tracking criteria.

20. A non-transitory computer-readable medium comprising instructions that when executed by a processor cause the processor to perform operations comprising:

obtaining first sensor data from a first sensor on the HMD, the first sensor configured to capture sensor data corresponding to a position of an eye of a user within an eye box region representing a 3-dimensional region in space in front of at least one display of the HMD;

based on the first sensor data, detecting a gaze of a user of the HMD;

based on detecting the gaze, determining an initial user presence corresponding to a user wearing the HMD; and based on determining the initial user presence, activating the at least one display of the HMD by changing a state of the at least one display from an inactive state to an active state.

* * * * *